United States Patent [19]

Brunn

[11] 4,369,628

[45] Jan. 25, 1983

[54] METHOD AND APPARATUS FOR IMPROVING THE FIREDAMP SAFETY OF AN INTERNAL COMBUSTION ENGINE FOR UNDERGROUND OPERATION

[75] Inventor: Martin Brunn, Bonn, Fed. Rep. of Germany

[73] Assignee: Brunn GmbH & Co. KG, Bonn, Fed. Rep. of Germany

[21] Appl. No.: 177,820

[22] Filed: Aug. 13, 1980

[30] Foreign Application Priority Data

Aug. 16, 1979 [DE] Fed. Rep. of Germany ....... 2933137

[51] Int. Cl.³ .............................................. F02G 5/04
[52] U.S. Cl. ...................................... 60/618; 60/320
[58] Field of Search ................. 60/320, 280, 309, 618; 62/238.3, 101

[56] References Cited

U.S. PATENT DOCUMENTS 4,049,972  9/1977  Crowdy et al. .................. 60/618 X
4,182,127  1/1980  Johnson ................................ 60/618

FOREIGN PATENT DOCUMENTS 2149506  4/1972  Fed. Rep. of Germany ........ 60/309

*Primary Examiner*—Michael Koczo
*Attorney, Agent, or Firm*—Spencer & Kaye

[57] ABSTRACT

A method and apparatus for improving the firedamp safety of an assembly for use in underground mine workings, the assembly including an internal combustion engine and an absorption-type refrigeration machine having a refrigerant circuit for generation of a refrigerated fluid stream, such improvement being effected by the provision of heat exchange components connected for supplying operating thermal energy to the refrigeration machine by passing the hot exhaust gases generated by the internal combustion engine through the refrigeration machine, and for cooling the exhaust gases after they exit the refrigeration machine by transferring heat therefrom to the refrigerated fluid stream.

8 Claims, 2 Drawing Figures

METHOD AND APPARATUS FOR IMPROVING THE FIREDAMP SAFETY OF AN INTERNAL COMBUSTION ENGINE FOR UNDERGROUND OPERATION

BACKGROUND OF THE INVENTION

The invention relates to a method for improving the firedamp safety of an assembly including an internal-combustion engine for use in underground mine workings, particularly an underground locomotive.

In connection with assemblies of the above-identified type, particularly for use in hard coal mine workings, care must be taken that they be absolutely safe against firedamp explosions. This necessitates keeping the external temperature of the internal-combustion engine exhaust gas pipe below a certain given value, for example 150° C. If the exhaust gas pipe is provided with a water cooled jacket, the intended cooling can be realized only incompletely and the temperature of the gases entering the environment can easily lie above the given limit temperature value. An improvement can be realized if water from a reservoir is injected into the exhaust system so that the evaporating water provides the necessary cooling for the exhaust gases. But this requires relatively complicated additional equipment which moreover demands constant maintenance. In addition, the operating personnel must constantly monitor the supply of water in the injection system so as to prevent shutdown of the machine when the temperature is exceeded due to lack of water.

With the advance of underground mining to depths of more than 1000 m, there arises the additional problem that the ambient temperature, which is already high due to the emission of heat in the form of radiation, heated cooling air and hot exhaust gases, is increased even more by heat dissipated from the internal-combustion engine of the equipment, generally a Diesel engine. Thus, according to a rough estimate, ventilation must be made available underground for an underground mine working at the rate of about 4 m³/h per installed engine horse power. With increasing depths, making available such quantities of air becomes more and more difficult and costly. It does not matter in this connection whether the machinery in question is a locomotive or a stationary machine since the above outlined problem of firedamp safety as well as the problems of increased heat emission by the internal-combustion engine occur equally in both cases.

SUMMARY OF THE INVENTION

With the aid of the method according to the invention, the firedamp safety of such assemblies will now be improved.

This is accomplished according to the invention in that an absorption-type refrigeration machine is operated with the hot exhaust gases from the internal-combustion engine, and the exhaust gases from the internal-combustion engine which exit the absorption-type refrigeration machine are additionally cooled with at least part of the generated refrigeration stream. With the aid of this measure it is possible in a reliable way to cool the exhaust gases exiting the internal-combustion engine to such an extent that practically any desired temperature threshold can be maintained. Since such absorption-type refrigeration machines have practically closed circuits, such a system is essentially maintenance free and is operational practically from the time the internal-combustion engine is started. Monitoring of a water container as it is required with water jacket cooling or water injection cooling is completely eliminated.

Although in the above-described process the exhaust gases are reliably cooled and thus the necessary improvement in firedamp safety is realized, the heat removed from the exhaust gases is released again during the required cooling of the absorber and of the liquefier of the absorption-type refrigeration machine and is returned to the environment. As a result, the ambient temperature underground, which is high in any case, is heated further, as before, and the temperature must be equalized again by the corresponding additional input of air by way of ventilation. A further difficulty is that due to the relatively high ambient temperature underground, the cooling faces of the absorber and of the liquefier must be made very voluminous and considerable ventilator power must be provided. While this is still acceptable within certain limits for stationary underground equipment, it becomes difficult under various aspects for locomotives. For example, in view of the constricted space conditions, the vehicle cannot be enlarged in size as desired, since free space profiles, ability to move through curves, etc. must be taken into consideration.

In order to eliminate the problems occurring in this connection, one feature of the method according to the invention provides that in an assembly including a turbine for generating additional shaft energy, the exhaust gases from the internal-combustion engine, after flowing through the absorption-type refrigeration machine and before being cooled, are fed to a heat exchanger for heating the working medium for the turbine. This feature has the advantage that a considerable portion of the residual heat of the exhaust gases, after leaving the absorption-type refrigeration machine, is additionally utilized to evaporate the working medium for the turbine. Thus the required cooling energy for cooling the exhaust gases is utilized with the aid of the "cold" generated by the absorption-type refrigeration machine so that this cooling energy is available for other purposes. The additional shaft output thus obtained from the "wasted energy" can then be used, depending on the size of the assembly, to cover the requirement for (electrical) energy for additional drives. This can be done, for example, in such a manner that the turbine is connected together with a generator and furnishes the corresponding electrical energy through a voltage and/or frequency converter, which energy can then be used, for example, to charge a battery or to directly supply current collectors.

A further advantageous feature of the invention provides that the working medium for the turbine circuit is utilized to cool the refrigerant circuit for the absorption-type refrigeration machine. In an absorption-type refrigeration machine considerable quantities of heat must be dissipated during cooling of the absorber. These quantities correspond in order of magnitude approximately to the quantity of heat supplied by the exhaust gases of the internal-combustion engine to the ejector of the absorption-type refrigeration machine. If now the absorber is cooled with the working medium of the turbine circuit, the resulting thermal energy can here again be utilized via the turbine, in the form of energy recovery, as additional shaft energy. Moreover, the thus realized energy conversion also results in a reduction of the quantities of heat dissipated to the environment. A further advantage of the utilization of the heat quantities available from the exhaust gases and from cooling of the absorber is that a medium with much greater heat capacity than air can be selected for cooling so that there automatically results a reduction in volume and thus in the structural size of the heat exchanger.

A further feature of the method according to the invention provides that, in an assembly which generates additional pressure, the heat generated in the hydraulic circuit of the assembly is introduced through a heat exchanger to the working medium of the turbine circuit. Since the hydraulic circuit which must be provided to operate the hydraulic equipment in a plurality of such assemblies also produces considerable quantities of heat from cooling the hydraulic fluid, the working medium of the turbine circuit can advisably be used to cool the hydraulic fluid so that here again the desired reduction in size of the cooling equipment is realized.

A further feature of the method according to the invention provides that the evaporator of the absorption-type refrigeration machine serves as the heat exchanger for a circulating coolant which is at least in part conducted through an exhaust gas cooler. While it is possible in principle to remove the "cold" present at the evaporator of the absorption-type refrigeration machine by cooling a stream of air which then serves to perform the various cooling tasks, it is here again of advantage to circulate the coolant. In this manner, media having a high heat capacity can be selected, resulting in a corresponding reduction of the size of the heat exchanger surfaces to be cooled at the evaporator, as well as at the individual locations to be cooled. Here again a reduction of the structural size of the individual components accommodates the limited space conditions encountered by an underground assembly, particularly an underground locomotive.

Another feature of the method according to the invention for an assembly including an additional turbine further provides that part of the coolant of the coolant circuit is used to cool the working medium of the turbine at the turbine discharge side. Since the utilization of the heat from the exhaust gases for heating the working medium of a turbine circuit results in a reduction of the cooling energy required to cool the exhaust gases before they are discharged into the environment, a considerable portion of the cooling energy available from the absorption-type refrigeration machine is available for other uses. If at least part of this excess is used to cool the working medium of the turbine at the turbine discharge side, the temperature gradient available for the turbine can be enlarged and thus the generated shaft energy can likewise be increased.

To the extent that the cooling energy made available by the absorption-type refrigeration machine is not required to cool the exhaust gases and to cool the working medium of the turbine circuit, this cooling energy can be used to cool the liquefier of the absorption-type refrigeration machine, to further cool the hydraulic circuit and to air-condition the control rooms associated with the locomotive. For example, it is possible in underground locomotives to air-condition, in addition to the driver's cabin, the passenger vehicles which are connected with the locomotive by respective supply lines.

The invention further relates to an assembly including an internal-combustion engine for use in underground mine workings, particularly an underground locomotive with improved firedamp safety according to the method of the invention.

Although German Offenlegungsschrift No. 2,750,314 discloses to air-condition the control rooms of an underground locomotive with the aid of a compressor-type air-conditioner, the internal-combustion engine must then be dimensioned correspondingly larger since the driving power for the compressor of the air-conditioner must be obtained directly from the drive shaft of the internal-combustion engine. It is therefore desirable to design the cooling output of this air-conditioner just large enough to handle the air conditioning of the two control rooms. The problem of improving the firedamp safety of the internal-combustion engine and, moreover, the reduction of the heat dissipated by the assembly to the environment, is not considered in this prior art locomotive since cooling of the condenser of the air-conditioner is effected by the stream of cooling air for cooling the engine so that the heat generated there is discharged directly into the environment. According to the invention, the above-defined assembly includes a known absorption-type refrigeration machine. In addition, the exhaust gas line of the internal-combustion engine is connected with the ejector of the absorption-type refrigeration machine and with an exhaust gas cooler downstream thereof, when seen in the direction of flow of the exhaust gases. Furthermore the exhaust gas cooler is connected with the refrigerant circuit of the absorption-type refrigeration machine. With such an arrangement it is not only possible to realize reliable cooling of the exhaust gases as required to improve the firedamp safety, but the considerable quantities of heat contained in the exhaust gases which heretofore had been discharged unused into the environment are utilized to generate cooling energy. In this manner, the generated cooling energy is greater than the cooling energy required to further cool the exhaust gases with the aid of the exhaust gas cooler. Therefore, this cooling energy can be utilized for further purposes, for example to air-condition control rooms or to cool the coolant and lubricant circuits of the engine.

Another feature of the invention is that, in addition to the internal-combustion engine, a turbine is provided to generate additional shaft energy. A heat exchanger is disposed in the exhaust gas line of the internal-combustion engine which, when seen in the direction of flow of the exhaust gases, is downstream of the ejector of the absorption-type refrigeration machine and upstream of the exhaust gas cooler so as to cause the working medium of the turbine circuit to be heated. Such an arrangement not only permits further utilization of the thermal energy, which would otherwise be discharged unused with the exhaust gases, to generate further shaft energy, but at the same time the arrangement reduces the cooling energy required to cool the exhaust gases so that more cooling energy is available for other purposes. The shaft energy can preferably be used to generate electrical energy for operation, possibly via a battery, of accessory devices such as pumps, fans, and lights, and for supplying current for the remaining electrical equipment onboard the train. Depending on the power output of the internal-combustion engine of the assembly, it is also possible for Diesel-electric assemblies, in which electrical energy is generated on the spot with the aid of the internal-combustion engines, to utilize, with the aid of modern electronic control systems, the electrical energy generated by the turbine directly. For operation; for example, in a Diesel-electric locomotive the electric energy generated by the turbine can be used directly to drive the locomotive.

A further feature of the invention provides a design of the absorber of the absorption-type refrigeration machine as a heat exchanger for heating the working medium of the turbine circuit. In this way the considerable amount of heat to be dissipated at the absorber can also be utilized to generate additional shaft energy. Since the liquid working medium selected for the turbine circuit evaporates only when heated, this measure also permits a considerable reduction of the cooling surfaces required for the absorber. This is so because the cooling effect from evaporation of a liquid medium is considerably greater than the cooling effect from blowing air.

A further advantageous feature of the invention provides that in an assembly including a device for generating pressurized oil, a heat exchanger connected with the turbine circuit is provided for cooling the pressurized oil in the hydraulic circuit. Here again the developing heat can be utilized additionally to generate shaft energy. At the same time, this heat is prevented from being discharged to the environment.

Another advantageous feature provides that the evaporator of the absorption-type refrigeration machine is designed as a heat exchanger which is in communication with the exhaust gas cooler by means of a circular conduit through which a pump circulates a coolant. This arrangement makes it possible to use a liquid coolant having a relatively high heat capacity so that a considerable reduction in the structural size of the evaporator as well as the waste gas cooler can be achieved. A further advantageous feature of the invention finally provides that the circular conduit is provided with branch conduits through which further locations to be cooled, particularly a cooler for the working medium at the turbine discharge side, are in communication with the circular conduit. By cooling the working medium at the turbine discharge side the pressure gradient available to the turbine can be increased considerably so that the conversion of thermal energy to mechanical energy is improved. By means of a liquid coolant conducted in the circular conduit and its corresponding branches it is possible, with small structural sizes, to supply even remotely located cooling locations with cooling energy, for example the lubricant and radiator circuits of the Diesel engine, the oil cooler of a possibly provided hydraulic circuit, corresponding exchanger surfaces for air-conditioning of control rooms, etc.

DESCRIPTION OF THE PREFERRED EMBODIMENTS

Figure 1:
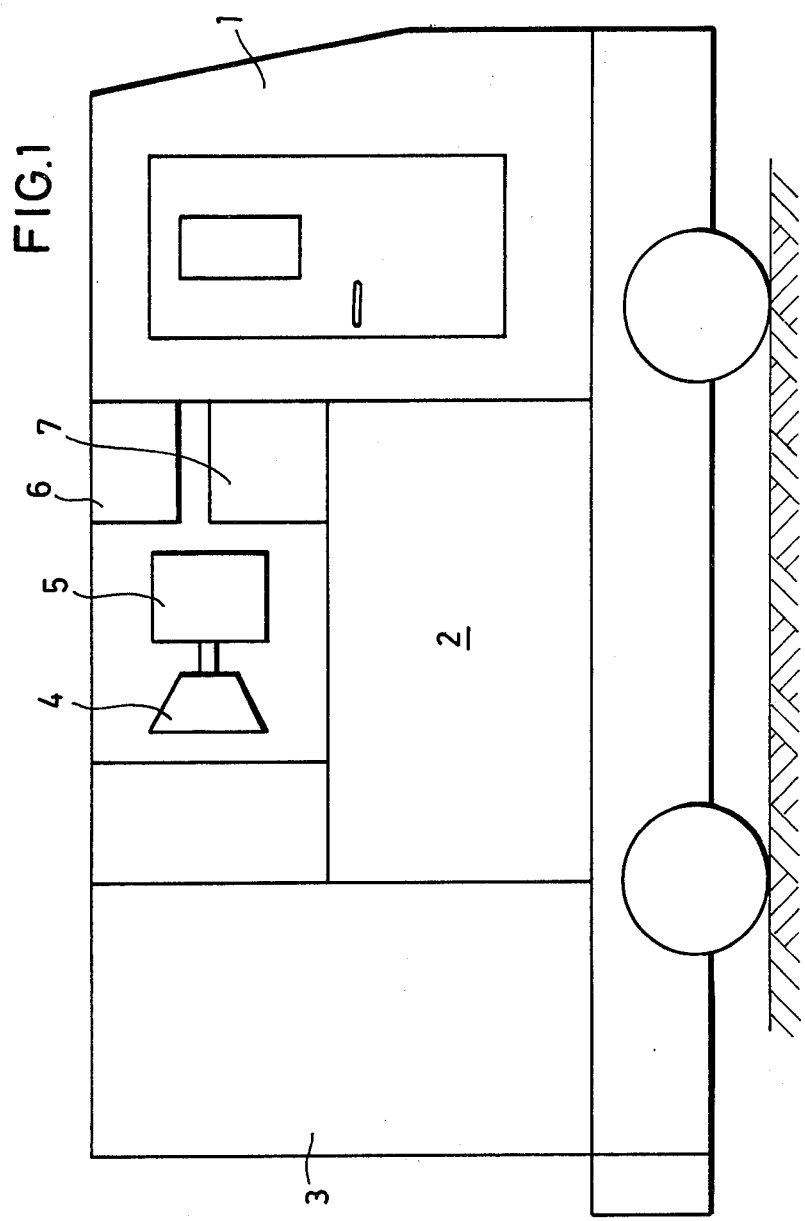
FIG. 1 is a schematic representation of the arrangement of the individual assemblies in an underground locomotive.

FIG. 1 shows an underground locomotive which in the customary arrangement includes a closed driver's cabin 1 and an internal-combustion engine 2, here a Diesel engine, with the associated other drive elements not shown in detail. In addition to the internal-combustion engine 2, the underground locomotive is provided with an absorption-type refrigeration machine 3, whose structure will be explained in detail with the aid of the diagram of FIG. 2. Moreover, in the illustrated embodiment, the locomotive is equipped with a turbine 4 which drives a generator 5 to feed a battery 7 in a known manner via a frequency and voltage converter 6.

Figure 2:
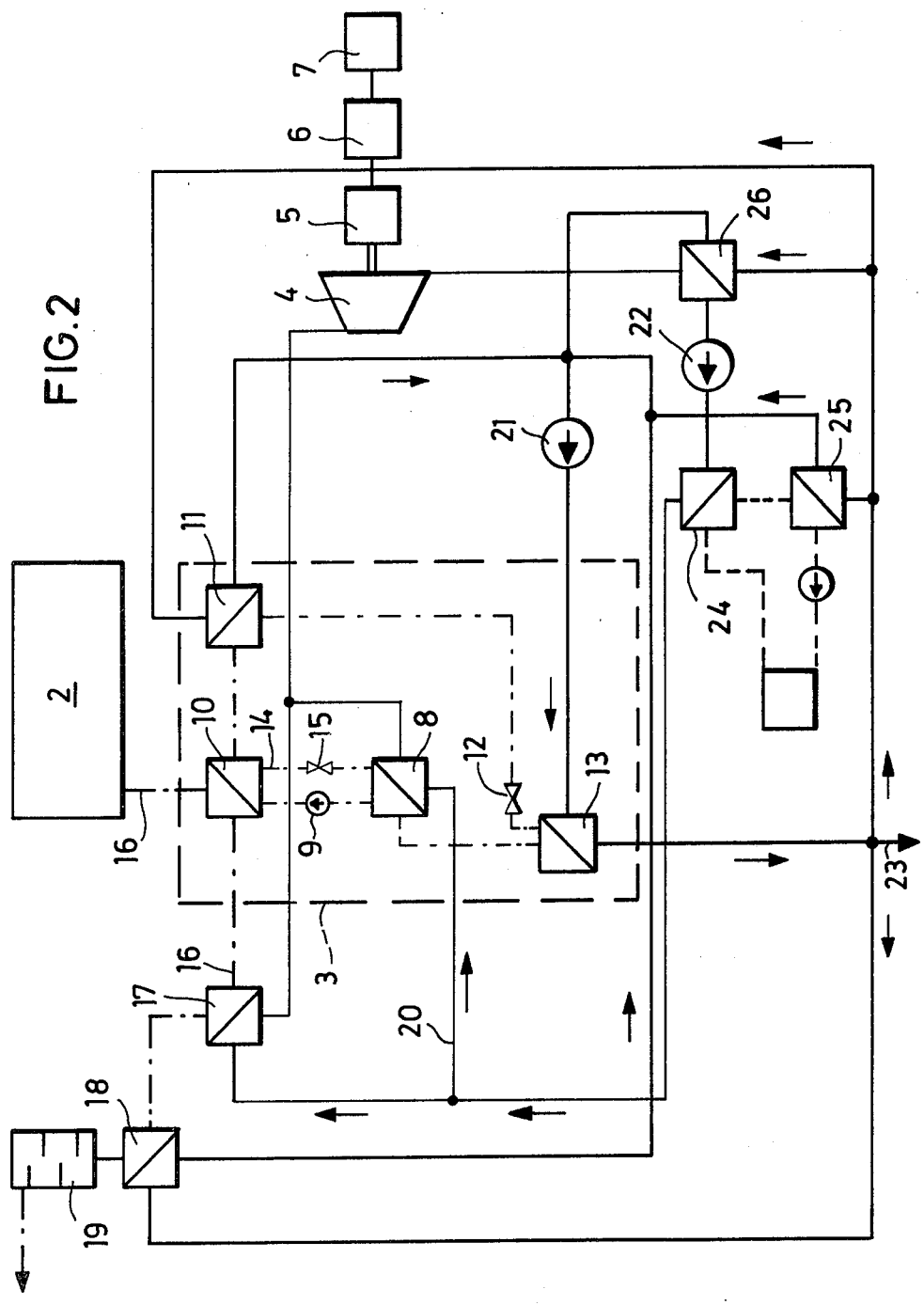
FIG. 2 is a diagram showing the interconnection between the individual assemblies.

The connections between the individual assemblies will be explained with the aid of the circuit diagram of FIG. 2.

To aid understanding, the individual assemblies of the absorption-type refrigeration machine 3 will first be discussed in detail. The machine 3 is delimited in the drawing by a dashed line. The structure of an absorption-type refrigeration machine is known in principle. The closed refrigerant circuit of this machine is depicted by thin dot-dash lines. The refrigerant is collected in an absorber 8 and is pumped via a compressor 9 into an ejector 10. The low boiling point component of the refrigerant which evaporates in the ejector 10 is conducted to the liquefier 11, is cooled there and expanded via a choke valve 12 into the evaporator 13. The evaporated portion of the refrigerant is then returned into the absorber 8 and there absorbed again under cooling by the refrigerant component having the higher boiling point. The hot weak refrigerant solution is also returned to the absorber via a conduit 14 including a choke valve 15.

The thermal energy required to evaporate the low boiling point component of the refrigerant is delivered to the ejector 10 from the hot exhaust gases of the Diesel engine 2, the exhaust gas path being represented by heavy dot-dash lines. For this purpose, the exhaust line 16 is conducted over a corresponding heat exchanger surface of the ejector 10. From the ejector 10, the exhaust line 16 leads to a heat exchanger 17 of the turbine circuit (explained in detail below) and to an exhaust gas cooler 18 which is then followed in the conventional manner by a muffler 19.

With the aid of the heat exchanger 17 in the exhaust line 16, the working medium circulating through the turbine 4 is heated and evaporated, and the temperature of the exhaust gases of the Diesel engine is simultaneously lowered correspondingly.

The turbine working medium flow path is represented by thin solid lines. Since considerable quantities of heat are also released in the absorber 8 of the refrigerant circuit of the absorption-type refrigeration machine, part of the working medium of the turbine circuit is conducted through a branch line 20 over the associated heat exchanger surface of the absorber 8 so that the thermal energy developed there is also absorbed by the working medium of the turbine circuit and can be converted to shaft output in the turbine 4.

While it is possible in principle to remove the cooling energy available at the evaporator 13 via an appropriate stream of air, in the illustrated embodiment a closed coolant circuit containing a liquid coolant is provided so as to be able to reduce the structural size of the other cooling surfaces as well. This closed circuit is represented by heavy solid lines. The coolant is pressed with the aid of a pump 21 into the evaporator 13 which is designed as a heat exchanger and is conducted from there to the individual cooling locations. Thus, part of the coolant is conducted to the exhaust gas cooler 18, another part is conducted through the liquefier 11 of the absorption-type refrigeration machine, and a further part through the condenser 26 of the turbine circuit in which a pressure increasing pump 22 is provided.

The "amount of cooling" exceeding the cooling energy requirements of the assembly itself can then be supplied to other locations to be cooled, which are here indicated by a load 23. Adjustable or permanently set valves (not shown) are disposed in the individual coolant branch lines emanating from the evaporator 13 to permit the precise setting of the coolant stream with respect to the individual coolant locations. Thus the cooling energy can be set precisely to the location of the assembly in question.

If the locomotive in question is equipped with a hydraulic system, represented by heavy broken lines, part of the developing heat can be dissipated, via a heat exchanger 24, to the turbine circuit, while the desired oil temperature can be set, depending on the reduction in temperature effected by the heat exchanger, by an additional oil cooler 25 which is connected through a branch line to the coolant circuit of the evaporator.

Since the problems of firedamp safety and the reduction of heat dissipation in underground mine workings occur quite generally, the improvement according to the invention is not limited to locomotives of conventional design, i.e. to track-bound vehicles, but is applicable in the same manner to trackless vehicles and other assemblies equipped with internal-combustion engines, e.g. mobile or even stationary transporting and conveying means, Diesel generators, pump assemblies, pressure generators for air and/or water, large size excavation equipment, etc.

I claim:

1. A method for improving the firedamp safety of an assembly for use in underground mine workings, the assembly including an internal combustion engine generating hot exhaust gases, an absorption-type refrigeration machine having a refrigerant circuit for generation of a refrigerated fluid stream, a turbine having a discharge side and a turbine circuit which includes a working medium and a heat exchanger, said method comprising the steps of:

operating the absorption-type refrigeration machine by passing the hot exhaust gases of the internal combustion engine through said refrigeration machine in a manner to effect heat exchange;

cooling the exhaust gases of the internal combustion engine which exit the refrigeration machine by transferring heat therefrom to the refrigerated fluid stream;

heating the turbine working medium by transferring heat thereto from the exhaust gases of the internal combustion engine in the turbine heat exchanger; and cooling in the refrigerant circuit with the turbine working medium.

2. The method according to claim 1 wherein said step of heating the turbine working medium is performed after the exhaust gases of the internal combustion engine have exited the refrigeration machine but before said step of cooling the exhaust gases.

3. The method according to claim 1 or 2 wherein the assembly further includes a hydraulic circuit for generation of pressurized oil and including a heat exchanger, the method further comprising the step of:

heating the turbine working medium by conducting heat generated in the hydraulic circuit thereto via the hydraulic circuit heat exchanger.

4. A method for improving the firedamp safety of an assembly for use in underground mine workings, the assembly including an internal combustion engine generating hot exhaust gases, an absorption-type refrigeration machine having a refrigerant circuit for generation of a refrigerated fluid stream, a turbine having a discharge side and a turbine circuit which includes a working medium and a heat exchanger, said method comprising the steps of:

operating the absorption-type refrigeration machine by passing the hot exhaust gases of the internal combustion engine through said refrigeration machine in a manner to effect heat exchange;

cooling the exhaust gases of the internal combustion engine which exit the refrigeration machine by transferring heat therefrom to the refrigerated fluid stream;

heating the turbine working medium by transferring heat thereto from the exhaust gases of the internal combustion engine in the turbine heat exchanger; and cooling the turbine working medium at the turbine discharge side by effecting heat exchange with the refrigerated fluid stream.

5. An assembly providing improved firedamp safety, the assembly comprising:

an internal combustion engine for use in underground mine workings and including a hot exhaust gas line;

an absorption-type refrigeration machine having a refrigerant circuit for generation of a refrigerated fluid stream, and an absorber and an ejector each connected in the refrigerant circuit, said ejector being arranged in heat exchange relation with said hot exhaust gas line for evaporating a portion of the refrigerated stream;

means including an exhaust gas cooler connected in said exhaust gas line downstream of said ejector, with respect to the direction of exhaust gas flow, said means being connected for establishing a heat exchange communication between the exhaust gas and the refrigerated stream;

a heat exchanger connected in said exhaust gas line between said ejector and said exhaust gas cooler; and a turbine having a circuit including a working medium, said turbine circuit being connected to both said heat exchanger and said absorber for heating the turbine working medium.

6. The assembly according to claim 5, further comprising:

means for providing pressurized oil, said means having a hydraulic circuit which includes a heat exchanger connected to said turbine circuit for cooling the pressurized oil.

7. An assembly providing improved firedamp safety, the assembly comprising:

an internal combustion engine for use in underground mine workings and including a hot exhaust gas line;

an absorption-type refrigeration machine having a refrigerant circuit for generation of a refrigerated fluid stream, and an evaporator and an ejector connected in the refrigerant circuit, said ejector being arranged in heat exchange relation with said hot exhaust gas line for evaporating a portion of the refrigerated stream;

means including an exhaust gas cooler connected in said exhaust gas line downstream of said ejector, with respect to the direction of exhaust gas flow, said means being connected for establishing a heat exchange communication between the exhaust gas and the refrigerated stream;

a heat exchanger connected in said exhaust gas line between said ejector and said exhaust gas cooler;

a turbine having a circuit including a working medium and a cooler for cooling the working medium, said turbine circuit being connected to said heat exchanger for heating the working medium; and a conduit including means for pumping a coolant therethrough, said conduit including at least one branch conduit in communication with said turbine circuit cooler, and said evaporator being in communication with said exhaust gas cooler via said conduit.

8. The assembly according to claim 7 wherein said turbine circuit cooler is connected to said turbine circuit at the side thereof where the working medium is discharged from said turbine.

* * * * *